USO09332405B2

(12) United States Patent
Wang et al.

(10) Patent No.: US 9,332,405 B2
(45) Date of Patent: May 3, 2016

(54) SHORT MESSAGE BACKUP METHOD, MOBILE TERMINAL, AND SERVER

(71) Applicant: Tencent Technology (Shenzhen) Company Limited, Shenzhen (CN)

(72) Inventors: Qing Wang, Shenzhen (CN); Haoran Guo, Shenzhen (CN); Yixia Yuan, Shenzhen (CN); Xunchang Zhan, Shenzhen (CN); Chunyou Lin, Shenzhen (CN); Pengtao Li, Shenzhen (CN); Jiashun Song, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 163 days.

(21) Appl. No.: 13/971,764

(22) Filed: Aug. 20, 2013

(65) Prior Publication Data
US 2014/0038650 A1 Feb. 6, 2014

Related U.S. Application Data

(63) Continuation of application No. PCT/CN2013/080427, filed on Jul. 30, 2013.

(30) Foreign Application Priority Data

Aug. 1, 2012 (CN) .......................... 2012 1 0270337

(51) Int. Cl.
 *H04W 4/14* (2009.01)
 *H04W 4/12* (2009.01)
(52) U.S. Cl.
 CPC . *H04W 4/14* (2013.01); *H04W 4/12* (2013.01)
(58) Field of Classification Search
 None
 See application file for complete search history.

(56) References Cited

U.S. PATENT DOCUMENTS

2002/0152220 A1\* 10/2002 Kang et al. ..................... 707/101
2006/0068764 A1\* 3/2006 Lim ........................... 455/412.1

(Continued)

FOREIGN PATENT DOCUMENTS

CN 101304583 A 11/2008
CN 101404792 A 4/2009

(Continued)

OTHER PUBLICATIONS

How to Manage AutoArchive in Outlook 2010 by How-To Geek, archived on Jun. 16, 2011.\*
Tencent Technology, ISRWO, PCT/CN2013/080427, Oct. 31, 2013, 10 pgs.
Tencent Technology, IPRP, PCT/CN2013/080427, Feb. 3, 2015, 7 pgs.

*Primary Examiner* — Daniel Lai
(74) *Attorney, Agent, or Firm* — Morgan, Lewis & Bockius LLP

(57) ABSTRACT

The present invention discloses a short message backup method, mobile terminal, server, and system, and belongs to the field of communications. The method includes: obtaining a local short message of a mobile terminal, and storing the local short message of the mobile terminal in a local short message backup database file according to a preset format supported by a remote server; and sending the short message backup database file to the server, so that the server stores the short message backup database file and a user account, so as to complete short message backup. In the present invention, by storing a short message of a mobile terminal of a user as a short message backup database file of a preset format supported by a remote server, and sending it to the server for storage, the reliability and compatibility of short message backup are improved, and an operation is simple.

11 Claims, 14 Drawing Sheets

(56) References Cited

U.S. PATENT DOCUMENTS

2009/0307284 A1* 12/2009 Welingkar .......... G06F 11/1451
2010/0022260 A1    1/2010 Chang
2010/0063960 A1*  3/2010 Lehto ........................... 707/621

FOREIGN PATENT DOCUMENTS

| CN | 101765068 A | | 6/2010 |
|---|---|---|---|
| JP | 2003309669 A | * | 10/2003 |

* cited by examiner

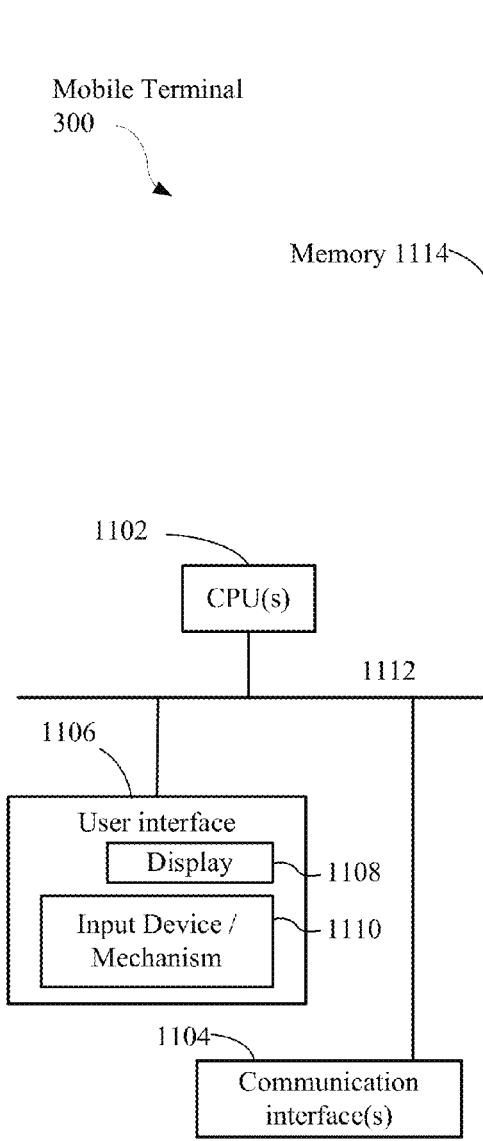

FIG. 11A

| Operating System | 1120 |
|---|---|
| Communication Module | 1121 |
| Obtaining module | 301 |
| Storage module | 302 |
| Sending module | 303 |
| Authentication request module | 304 |
| Recovery request module | 305 |
| Receiving module | 306 |
| Recovery module | 307 |
| Encryption module | 308 |
| Decryption module | 309 |
| Messaging module | 310 |
| Web Browser | 311 |
| Local mailboxes | 316 |
|   Inbox | 317 |
|     Identifier | 318 |
|     Local short messages | 319-a |
|   Outbox | 320 |
|     Identifier | 321 |
|     Local short messages | 319-b |
|   Draft box | 323 |
|     Identifier | 324 |
|     Local short messages | 319-c |
|   User-defined box | 326 |
|     Identifier | 327 |
|     Local short messages | 319-d |
| Preset message backup format(s) | 320 |
| Short message backup database | 330 |
|   Mailbox 1 | 332-1 |
|     Backup short message 1 | 333-11 |
|     Backup short message 2 | 333-12 |
|       ⋮ | |
|     Backup short message i | 333-1i |
|   Mailbox 2 | 332-2 |
|     Backup short message 1 | 333-21 |
|     Backup short message 2 | 333-22 |
|       ⋮ | |

Local Short
Message 319

Stored Short
Message 333

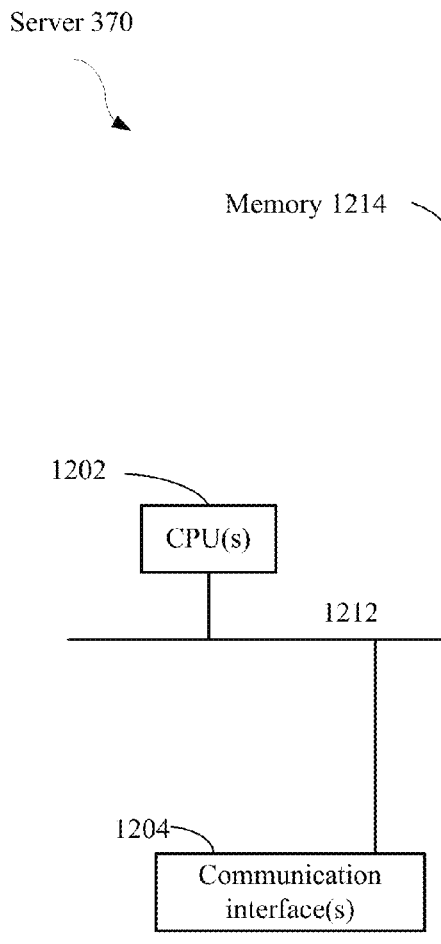

FIG. 12

| Operating System | 1220 |
| Communication Module | 1221 |
| First authentication module | 1403 |
| Receiving module | 1401 |
| Backup module | 1402 |
| Recovery quest processing module | 1404 |
| Second authentication module | 1405 |
| Backup and sending module | 1406 |

| Encryption module | 1408 |
| Decryption module | 1409 |

| Preset message backup format(s) | 320 |

```
Backed-up message database         330
   User Account 1                  1230-1
      User ID                      1231-1
      Password                     1232-1
   Mailbox 1                       332-1
      Backup short message 1       333-11
      Backup short message 2       333-12
      :
      Backup short message i       333-1i
   Mailbox 2                       332-2
      Backup short message 1       333-21
      Backup short message 2       333-22
      :

User Account 2                  1230-2
      User ID                      1231-2
      Password                     1232-2
   Mailbox 1                       332-1
      Backup short message 1       333-12
      :
      Backup short message i       333-1i
   Mailbox 2                       332-2
      Backup short message 1       333-21
      :
```

SHORT MESSAGE BACKUP METHOD, MOBILE TERMINAL, AND SERVER

RELATED APPLICATION

This application is a continuation application of PCT Patent Application No. PCT/CN2013/080427, entitled "SHORT MESSAGE BACKUP METHOD, MOBILE TERMINAL, AND SERVER," filed on Jul. 30, 2013, which claims priority to Chinese Patent Application No. 201210270337.5, entitled "SHORT MESSAGE BACKUP METHOD, MOBILE TERMINAL, SERVER, AND SYSTEM", filed on Aug. 1, 2012, both of which are incorporated by reference in their entirety.

TECHNICAL FIELD

The disclosed embodiments relate generally to the field of communications, and in particular, to a short message backup method, mobile terminal, server, and system.

BACKGROUND

With the development of mobile communications technologies, and in particular, with the popularization and application of smart phones and the use of all kinds of networking application software, the frequency of use of short messages has increased to a great extent. Meanwhile, the memory space of a mobile phone that is used for short messaging has also increased. As a result, the running efficiency of mobile phones is inevitably affected. In another aspect, when a user changes a mobile phone or a mobile phone is faulty, the user is confronted with security problems, such as the loss of short messages previously saved on the phone, or the unintended disclosure of private messages Therefore, short message backup and synchronization of a mobile phone has become an important concern in the industry.

In the prior art, a short message backup method mainly involves installing a PC software suite matched with a mobile phone system in a computer, connecting the mobile phone to the computer through a data line, and later, running the software suite on the PC to implement short message backup and recovery of the mobile phone.

However, in an existing short message backup manner, the short message backup and recovery can be implemented only through cooperation of the computer, the data line, and the PC software suite. In addition, the PC software suite is bound to a system platform of the mobile phone. Therefore, an actual backup and recovery operation is complex, and once an operation has completed, the backed up short messages are stored in the computer, where data reliability cannot be ensured. At the same time, under the existing situation, not all mobile phones have a matched PC suite to perform short message backup; therefore, compatibility of existing short message backup functions is poor, and short message backup can be performed only for a mobile phone having a specific model.

SUMMARY

In order to solve the problems of a complex operation, low reliability, and poor compatibility in an existing short message backup manner, embodiments of the present invention provide a short message backup method, mobile terminal, server, and system. The technical solutions are described as follows:

A short message backup method is provided, where the method includes:

obtaining a local short message of a mobile terminal, and storing the local short message of the mobile terminal in a local short message backup database file according to a preset format supported by a remote server; and sending the short message backup database file to the remote server, so that the remote server stores the short message backup database file in association with a user account, so as to complete short message backup.

A short message backup method performed at a remote server having one or more processors and memory for storing programs to be executed by the one or more processors is provided, where the method includes:

receiving a short message backup database file sent by a mobile terminal, where the short message backup database file is obtained by storing a local short message of the mobile terminal according to a preset format supported by the mobile terminal; and correspondingly storing the short message backup database file and a user account, so as to complete short message backup.

A mobile terminal includes:
one or more processors;
memory; and
one or more program modules stored in the memory and to be executed by the one or more processors, the program modules further including:

an obtaining module, configured to obtain a local short message of a mobile terminal;

a storage module, configured to store the local short message of the mobile terminal in a local short message backup database file according to a preset format supported by a remote server; and a sending module, configured to send the short message backup database file to the remote server, so that the remote server stores the short message backup database file and a user account, so as to complete short message backup.

A server includes:
one or more processors;
memory; and
one or more program modules stored in the memory and to be executed by the one or more processors, the program modules further including:

a receiving module, configured to receive a short message backup database file sent by a mobile terminal, where the short message backup database file is obtained by storing a local short message of the mobile terminal according to a preset format supported by the mobile terminal; and a backup module, configured to correspondingly store the short message backup database file and a user account, so as to complete short message backup.

Beneficial effects of the technical solutions provided by the embodiments of the present invention are described as follows: By storing a short message of a mobile terminal of a user as a short message backup database file of a preset format supported by a remote server, and sending it to the server for storage, the reliability and compatibility of short message backup are improved, and an operation is simple.

BRIEF DESCRIPTION OF THE DRAWINGS

The aforementioned implementation of the invention as well as additional embodiments will be more clearly understood as a result of the following detailed description of the various aspects of the invention when taken in conjunction with the drawings. Like reference numerals refer to corresponding parts throughout the several views of the drawings.

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 11A is a block diagram of a mobile terminal according to some embodiments;

FIG. 12 is a block diagram of a backup server according to according to some embodiments.

DETAILED DESCRIPTION

To make the objectives, technical solutions, and advantages of the present invention more comprehensible, the following further describes some embodiments of the present invention in detail with reference to the accompanying drawings.

Embodiment 1

Figure 1:
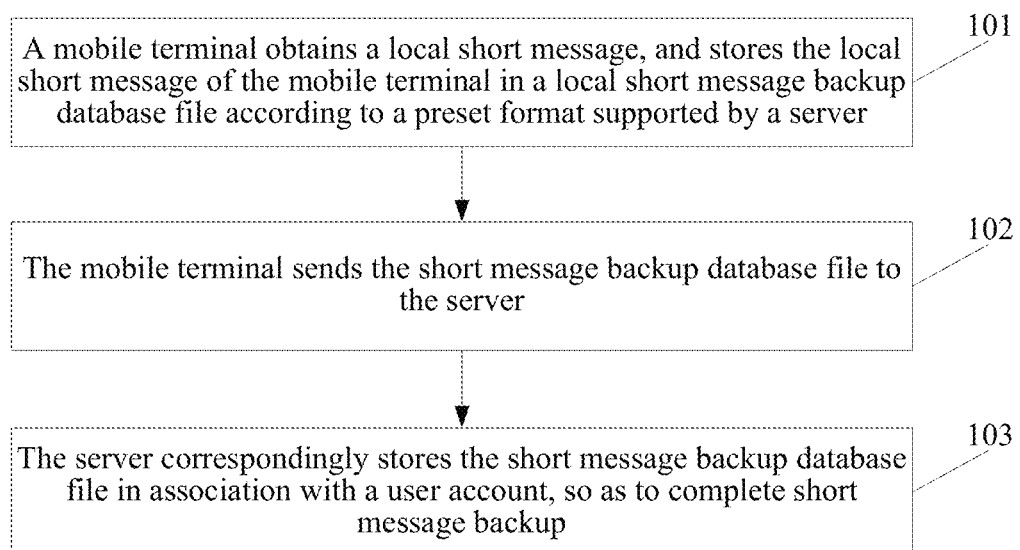
FIG. 1 is a schematic flowchart of a short message backup method according to Embodiment 1.

FIG. 1 shows an embodiment of a short message backup method 100 in accordance with the present application. In the illustrated embodiment, a mobile terminal (e.g., a mobile phone) obtains one or more local short messages (e.g., short messages sent or received at the mobile terminal), and stores the local short messages of the mobile terminal in a local short message backup database file (101). In some embodiments, the local short messages are stored in the local short message backup database file according to a preset format supported by a remote server (e.g., a backup server). The mobile terminal then sends the short message backup database file to the backup server (102). The server correspondingly stores the short message backup database file in association with a user account, so as to complete short message backup process initiated by the mobile device (103).

In some embodiments, the short messages that are backed-up may be associated with one or more different mailboxes maintained on the mobile terminal, such as an inbox, an outbox, a drafts mailbox, and one or more user-defined mailboxes, such as mailboxes corresponding to messages exchanged with particular individuals or particular projects. In some embodiments, the association of short messages with respective mailboxes is preserved in the short message backup database file. In some embodiments, prior to being backed-up as described herein, the short messages are stored in a local/temporary memory of the mobile terminal, which puts the messages at risk if the memory capacity for storage of the short messages is exceeded or if the memory fails. In some embodiments, the preset format used to store short messages in the backup database file is negotiated between the server and the mobile terminal prior to a backup operation. In some embodiments, the preset format is selected by the mobile terminal from one or more present formats that are known to be supported by the server and a respective mobile terminal. In some embodiments, the mobile terminal stores the messages in the backup database file in a native format, which the server is able to interpret based on server knowledge of device characteristics of the mobile terminal (e.g., hardware and software model and version information provided to the server by the mobile terminal—e.g., in a user agent string transmitted by a mobile browser).

Accordingly, by storing one or more short messages of a mobile terminal of a user in one or more short message backup database files, and sending the one more message backup database files to the server for storage, the reliability and compatibility of short message backup methods are improved, and simple operation of such short message backup methods is enabled. As a result, users of mobile devices are provided with easy to use, effective backup and recovery solutions for their short messages.

Embodiment 2

Figure 2:
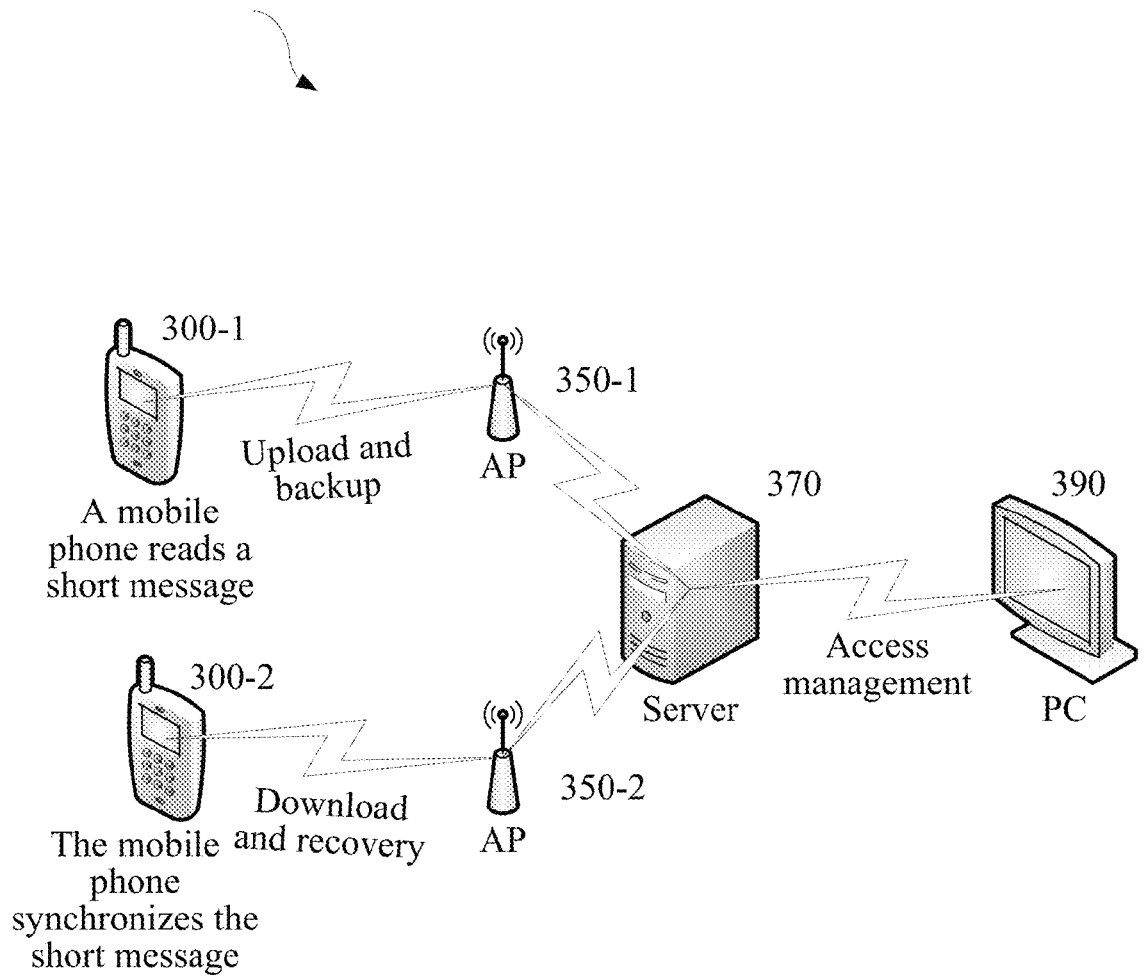
FIG. 2 is a schematic structural diagram of a short message backup platform according to Embodiment 2.

FIG. 2 illustrates an environment/platform 250 in which embodiments of short message backup and recovery methods described herein can be implemented. The platform 250 includes one or more mobile phones 300, one or more access points (AP) 350, one or more short message backup/recovery servers 370, and one or more access management computers (PC) 390. In some embodiments, a mobile phone 300 may perform short message backup and recovery though the platform 250, an access point (AP) 350 provides network access for the mobile phone 300, and a server 370 may back up short messages uploaded by a user, and provide access, editing, and deletion functions for a PC user (e.g., a user of a mobile phone 300 employing the platform 250 to backup and recover their short messages). In some embodiments, the access points (AP) 350 can be replaced with any device that provides Internet access. In some embodiments, the platform 250 can be employed to provide short message backup and recovery services for any mobile electronic device that is used to send and/or receive short messages, such as, without limitation, a laptop computer, smart phone, tablet computer, portable gaming device, or e-reader.

Figure 3:
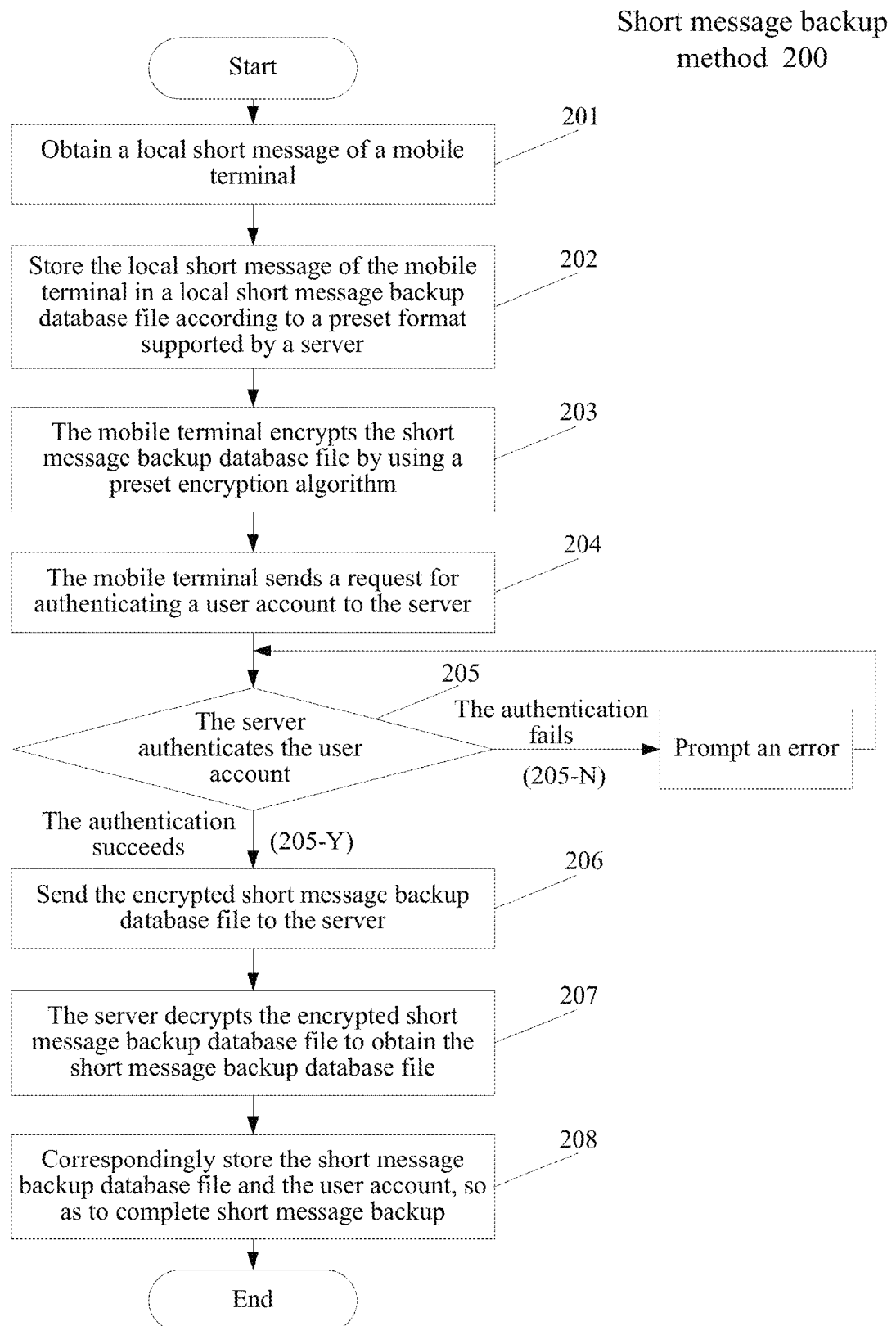
FIG. 3 is a schematic flowchart of a short message backup method according to Embodiment 2.

FIG. 3 shows an embodiment of a short message backup method 200 that can be implemented within the platform provided by Embodiment 2. Initially, one or more local short messages of a mobile terminal 300-1 (FIG. 2) are obtained (201). The one or more local short messages of the mobile terminal 300-1 are then stored in a local short message backup database file on the mobile terminal 300-1. In some embodiments, the stored messages are formatted according to a recognizable preset data format supported by a backup server (202). Optionally, to provide security for content of the short messages being backed-up, the mobile terminal 300-1 encrypts the short message backup database file using a preset encryption algorithm (203). The mobile terminal 300-1 then sends a request for authenticating a user account (e.g., the user account associated with the user of the mobile terminal 300-1) to the server (204). The server 370 then attempts to authenticate the user account (205). If the authentication succeeds (205-Y), the sever 370 prompts the mobile terminal 300-1 to send the encrypted short message backup database file to the server for storage (206). If the authentication fails (205-N), the server 370 prompts an error and returns control to the mobile terminal 300-1 at operation (204). Upon completion of operation (206), the server 370 decrypts the encrypted short message backup database file to obtain the short message backup database file (207). The server 370 then stores the short message backup database file in association with the user account (208), so as to complete the short message backup method for the designated account of the mobile terminal 300-1.

In some embodiments, obtaining a local short message of a mobile terminal (e.g., at operation 201) includes: obtaining identifiers of all local mailboxes of the mobile terminal 300, and performing a traversal operation in each mailbox according to the identifier of the mailbox, so as to obtain short messages for such mailboxes. In some embodiments, the mailboxes include one or more of: an inbox, an outbox, a draft box, a user-defined mailbox, and so on. In some embodiments, information associated and backed up with a respective short message includes one or more of: content of the short message, sending time of the short message, a data amount of the short message, a phone number of a sender of the short message, or a phone number of a receiver of the short message, and so on. Note that the content of the local short message can include one or more of text, images, digital media content, such as a short video or music clip, or a link to content stored separately from the local short message (e.g., content accessible via the Internet identified by a URL or a short URL employed with a URL shortening service).

In some embodiments, storing the one or more local short messages of the mobile terminal 300 in a local short message backup database file according to a preset format supported by a remote server 370 (e.g., at operation 202) includes: storing one or more of the content of the short message, the sending time of the short message, the data amount of the short message, and the phone number of the sender of the short message or the phone number of the receiver of the short message in the short message in the local short message backup database file according to the preset format and based on a field.

It should be noted that, in mobile terminals 300 having different operating systems, or even in mobile terminals 300 having different models, formats for storing short messages in a mailbox may vary. As a result, in some embodiments, before the short message backup operation 200 is performed, the one or more short messages being backed up are converted to a preset format and are then saved into the local short message backup database file. In some embodiments, the preset format is negotiated and decided with the server in advance, so as to ensure that it can be identified and employed by both the mobile phone terminal 300 and the server 370. In addition, in some embodiments, the local short message backup database file is optionally invisible to the user. In some embodiments, the preset format may require, for example, storing content, time and data amounts of short messages, and phone numbers of senders and/or receivers of the short messages according to a field sequence negotiated by the mobile terminal and the server.

In some embodiments, a mobile terminal 300 encrypts the short message backup database file (e.g., at operation 203) using a preset encryption algorithm that is selected from a set of algorithms, including a symmetric encryption algorithm, an asymmetrical encryption algorithm, and so on. The preset encryption algorithm may be also identified and obtained through a negotiation by and between the mobile terminal 300 and the server 370. It should be apparent to one skilled in the art that any of a virtually unlimited variety of encryption methods can be employed for this purpose. In some embodiments, the encryption operation is performed by an encryption module 308 (FIG. 11A) provided by the mobile terminal 300.

In some embodiments, when a mobile terminal 300 sends a request for authenticating a user account to the server (e.g., at operation 204), the request for authenticating the user account may carry information that can prove an identity of the user, the user account, and/or the mobile terminal 300 of the user. For example, in some embodiments, this information might include a user account identifier and a password. In some embodiments, this information might also include one or more of a user or device identification number and a mobile phone number, etc. It should be noted that an operation performed in this step may be performed before any one of the operations 201 to 203, and in this embodiment, operations in step 201 to step 204 may be implemented through software built in the mobile terminal and used for short message backup, which can be installed in any smart mobile terminal. As a result, compatibility between participating mobile terminals 300 and servers 370 is ensured.

In some embodiments, when the server 370 authenticates a user account (e.g., at operation 205), the server 370 may make use of characteristic information it has stored for that particular user account—for example, password information. In this example, when the password input by the user is correct, the authentication operation (205) succeeds, and when the password input by the user is incorrect, the authentication operation (205) fails. In some embodiments, the sever can employ a wide range of known authentication methods—in combination or separately. For example, the server 370 can employ authentication methods based on cookies, certificates, or encryption-based keys. The server 370 can also employ authentication operation based on confirmation of fingerprints that are characteristic of particular user mobile terminals—for example, fingerprints based on a known hardware or software configuration of a particular user's mobile terminal.

In some embodiments, when the server 370 decrypts the encrypted short message backup database file to obtain the short message backup database file (e.g., at operation 207), the decryption algorithm used by the server to decrypt the encrypted short message backup database file should correspond to the encryption algorithm in step 203. As noted above, encryption (207) is optional, but performing encryption prior to transmission to the server 370 of the backup database file can reduce the probability of a disclosure of private user information and therefore enhances security and privacy of the user. In some embodiments, the decryption operation is performed by a decryption module 1409 (FIG. 12) provided by the server 370.

This embodiment provides a short message backup method, and by storing a short message of a mobile terminal of a user as a short message backup database file of a preset format supported by a remote server, and sending it to the server for storage, the reliability and compatibility of short message backup are improved, and an operation is simple.

Figure 4:
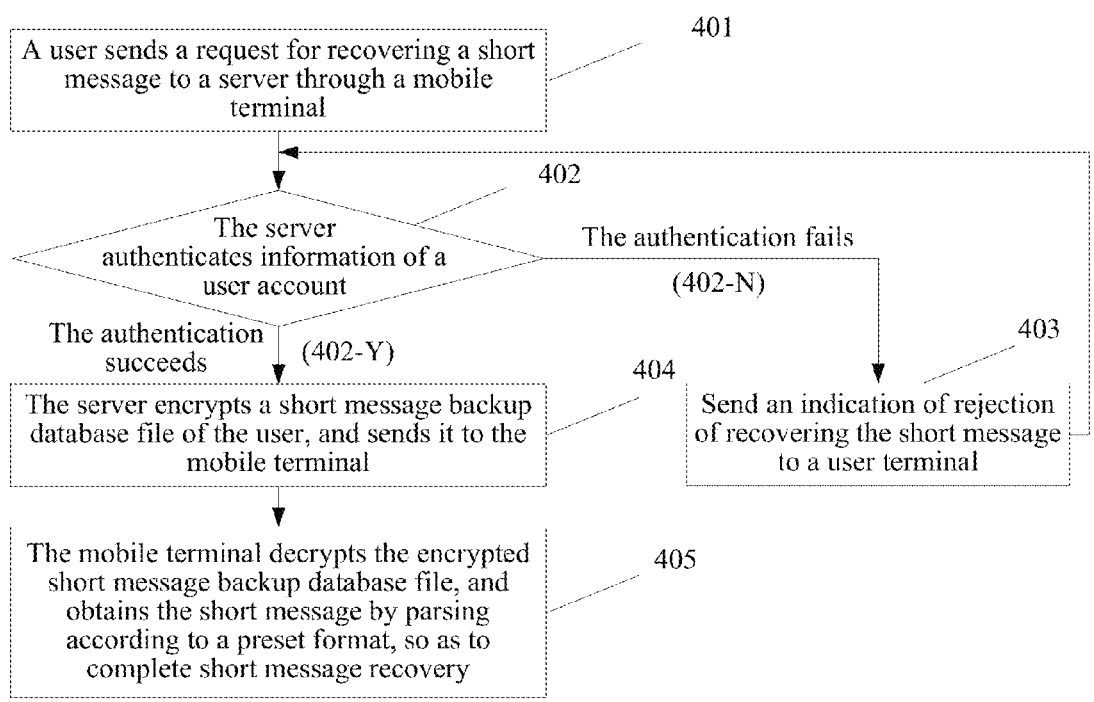
FIG. 4 is a schematic flowchart of a short message recovery method according to Embodiment 2.

FIG. 4 shows an embodiment of a short message recovery method 400 that can be implemented within the platform provided by Embodiment 2. The illustrated embodiment can be performed in conjunction with the short message backup method 300 illustrated in FIG. 3 and described above. For purposes of the following description, it is presumed that a user is synchronizing previously backed-up short messages to a mobile phone 300-2 that is different from the mobile phone 300-1 from which the messages were initially backed up. However, this is not a requirement; in fact, the mobile terminal 300-2 could be the same device as the mobile phone 300-1, or another type of device employed by the same user/account to send short messages, such as a tablet computer, laptop computer, or a portable gaming device with short messaging capabilities.

Referring to FIG. 4, a user sends a request for recovering one or more short messages to the server 370 through the mobile terminal 300-2 (401). Typically, the request for recovering the short message carries user account information to ensure that the correct collection of short messages is recovered. In some embodiments, the user account information might include a user account identifier and a password. The user account information might also include one or more of a user or device identification number, a mobile phone number, and/or a mailbox identifier for a mailbox to be recovered. In some embodiments, the request also includes the hardware and software information of the requesting mobile terminal. The server 370 then attempts to authenticate user account information for the mobile terminal 300 (402).

If the authentication fails (402-N), the server 370 sends an indication of rejection of recovering the one or more short messages to the mobile terminal that issued the recovery request (e.g., the mobile phone 300-2) (403). in lieu of sending the indication of rejection of recovering the one or more short messages, in some embodiments the server 370 may send an indication that the authentication of the user account information has failed. When authentication is successful (402-Y), the server 370 encrypts a short message backup database file of the user, and sends it to the mobile terminal 300-2 (404). In some embodiments, the encryption operation is performed by an encryption module 1408 (FIG. 12) provided by the server 370. In some embodiments, before the encryption, the server 370 first converts the short message backup database file from a first format to a second format supported by the requesting mobile terminal based on the hardware and software information of the requesting mobile terminal. For example, the mobile terminals 300-1 and 300-2 may run on different operating systems or different versions of the same operating systems. As a result, the file or data format supported by the first mobile terminal 300-1 when it uploads the short message backup database file into the server 370 may no longer be supported by the second mobile terminal 300-2 that requests the file. This situation may happen when a user replaces the first mobile terminal 300-1 with the second mobile terminal 300-2. To enable the user to access the short messages on the mobile terminal 300-2, the server 370 first invokes a format conversion module (which may be part of the encryption module 1408) for converting the short message backup database file from the first format to a second format supported by the mobile terminal 300-2 based on the hardware and software information of the mobile terminal 300-2. In some embodiments, the first format is not the format supported by the mobile terminal 300-1. Instead, it is a native format chosen by the server 370 when first receiving the file uploaded from the mobile terminal 300-1. For example, the server 370 may convert the data uploaded from the mobile terminal 300-1 to a native format that is not only more efficient to store the file but also more secure (e.g., using a user-provided password for further encrypting the file). In this case, the server 370 needs to convert the file to a format supported by the mobile terminal 300-2. The mobile terminal 300-2 then decrypts the encrypted short message backup database file, and obtains the one or more short messages included therein by parsing the decrypted messages according to the same preset format initially used by the mobile terminal 300-1 to format the messages prior to their storage in the short message backup database file, so as to complete short message recovery. In some embodiments, the decryption operation is performed by a decryption module 309 (FIG. 11A) provided by the mobile terminal 300. In some embodiments, the user of the second mobile terminal 300-2 is further prompted for providing a password to be used by the decryption module 309 for decrypting the decryption operation. This feature makes it more secure for protecting the short message backup database file because a third-party user cannot download the short message backup database file onto his or her own mobile terminal without providing this password that was chosen by the user when uploading the file to the server 370 from the mobile terminal 300-1.

As shown in FIG. 2, the platform 200 also allows for access management and control of small message backup and recovery operations through a computing device of a user, such as the personal computer (PC) 390 that is coupled to the server 370—typically via the Internet. In some embodiments, a user is enabled to perform various operations related to small message backup and recovery operations, and the associated short message backup data file, by logging into the server 370 from the PC 390 using saved account information. The access management computer 390 enables a user to perform operations such as editing, deletion, and copying of one or more short messages saved in the short message backup database file, or the entire short message backup database file, for their small message account corresponding to the provided account information.

This embodiment provides short message backup and recovery methods, and through the methods provided by this embodiment, a user can perform one or more simple operations to complete short message backup and recovery. Also, since the short messages are backed up in a server, reliability is high, and the backed-up messages can be downloaded and recovered at any time, so that cross-platform compatibility is good, and the methods are applicable to any smart phone or other portable electronic device that is used for sending and receiving of short messages.

Embodiment 3

Figure 5:
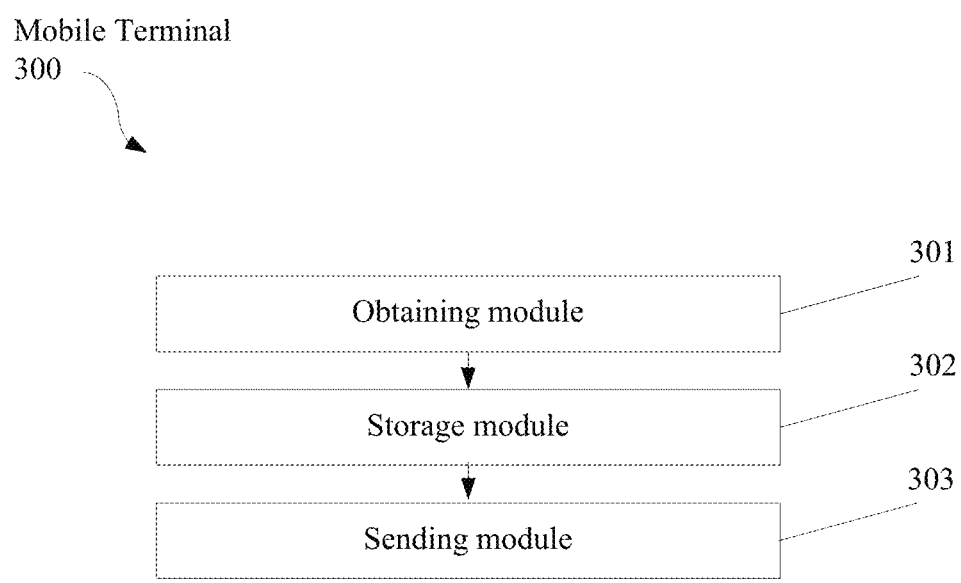
FIG. 5 is a schematic structural diagram of a mobile terminal according to Embodiment 3.

As shown in FIG. 5, some embodiments provide a mobile terminal 300, where the mobile terminal includes the following modules:

an obtaining module 301, configured to obtain a local short message of a mobile terminal;

a storage module 302, configured to store the local short message of the mobile terminal in a local short message backup database file according to a preset format supported by a remote server; and a sending module 303, configured to send the short message backup database file to the server, so that the server correspondingly stores the short message backup database file and a user account, so as to complete short message backup.

Furthermore, in some embodiments, the obtaining module 301 is configured to obtain an identifier of a local mailbox in the mobile terminal that is specified by a user, and perform traversal in the mailbox according to the identifier of the mailbox, so as to obtain one or more short messages in the mailbox.

Note that the above modules and other modules described below are described as distinct entities for purposes of illustration. The operations performed by these modules can be combined or decomposed into various arrangements of one or more modules as required by different embodiments.

Figure 6:
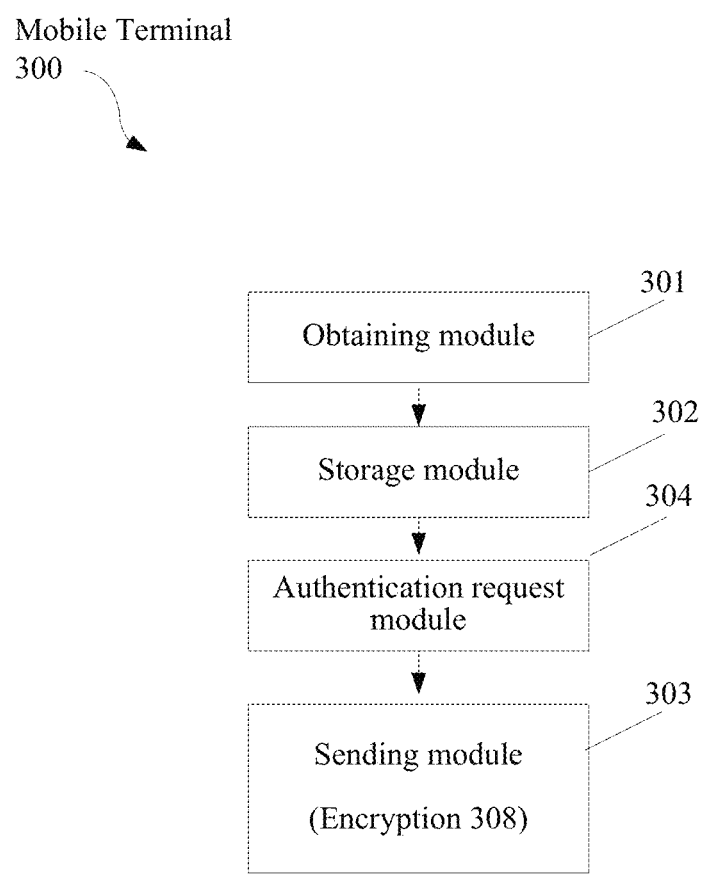
FIG. 6 is a second schematic structural diagram of mobile terminal according to Embodiment 3.

Furthermore, as shown in FIG. 6, some embodiments provide a mobile terminal 300 that further includes:

an authentication request module 304, configured to: before the sending module sends the short message backup database file to the server, send a request for authenticating the user account to the server, so that the server correspondingly stores the short message backup database file and the user account after the request for authentication succeeds, so as to complete the short message backup.

Furthermore, in some embodiments, the short message in the mobile terminal at least includes content of the short message, sending time of the short message, a data amount of the short message, and a phone number of a sender of the short message or a phone number of a receiver of the short message.

Furthermore, in some embodiments, the storage module 302 is specifically configured to store the content of the short message, the sending time of the short message, the data amount of the short message, and the phone number of the sender of the short message or the phone number of the receiver of the short message in the local short message backup database file according to the preset format and based on a field.

Furthermore, in some embodiments, the sending module 303 is specifically configured to encrypt 308 the short message backup database file to obtain the encrypted short message backup database file, and send the encrypted short message backup database file to the server, so that the server correspondingly stores the short message backup database file and the user account after performing decryption, so as to complete the short message backup.

Figure 7:
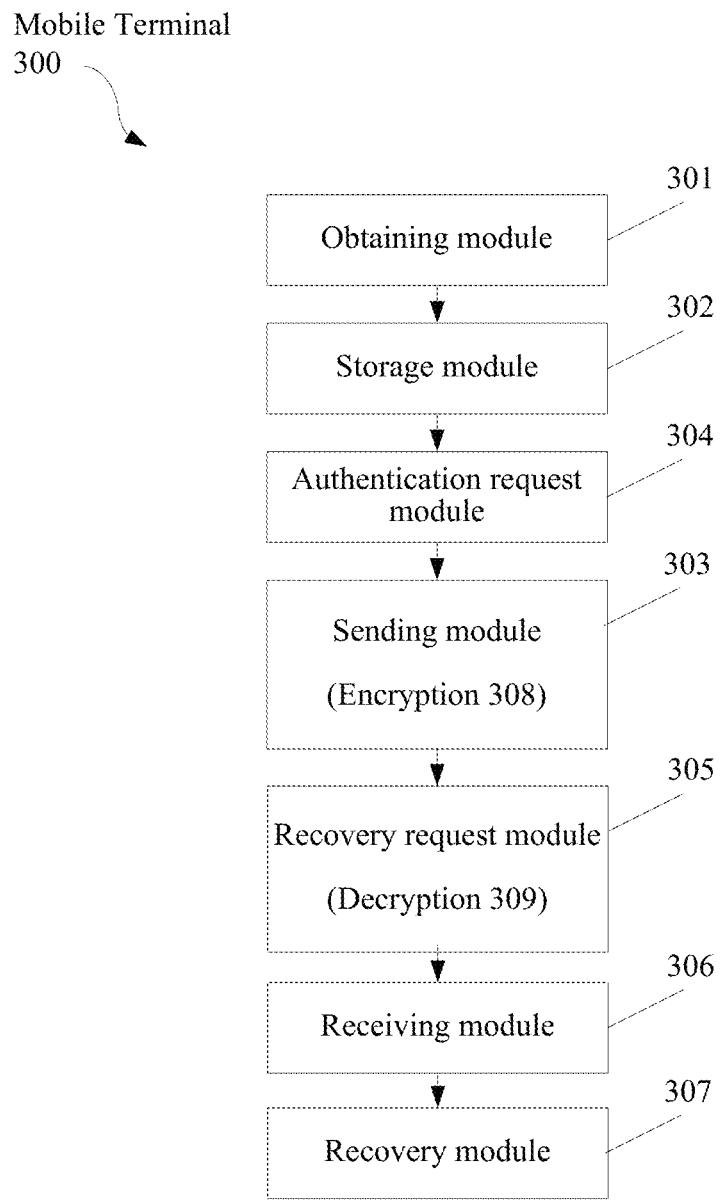
FIG. 7 is a third schematic structural diagram of a mobile terminal according to Embodiment 3.

Furthermore, as shown in FIG. 7, some embodiments provide a mobile terminal 300 that further includes:

a recovery request module 305, configured to send a request for recovering the short message to the server, where the request for recovering the short message carries information of the user account;

a receiving module 306, configured to: after the server succeeds in the authentication of the user account, receive the short message backup database file encrypted and sent by the server; and a recovery module 307, configured to perform a decryption operation (309) on the short message backup database file encrypted and sent by the server, so as to obtain the short message backup database file, and obtain the content of the short message, the sending time of the short message, the data amount of the short message, and the phone number of the sender of the short message or the phone number of the receiver of the short message by parsing according to the preset format, so as to complete short message recovery.

This embodiment provides a mobile terminal, where the mobile terminal can obtain a local short message, store it as a short message backup database file according to a preset format supported by a remote server, and send it to the server for backup, so that the reliability and compatibility of short message backup are improved, and an operation is simple.

Embodiment 4

Figure 8:
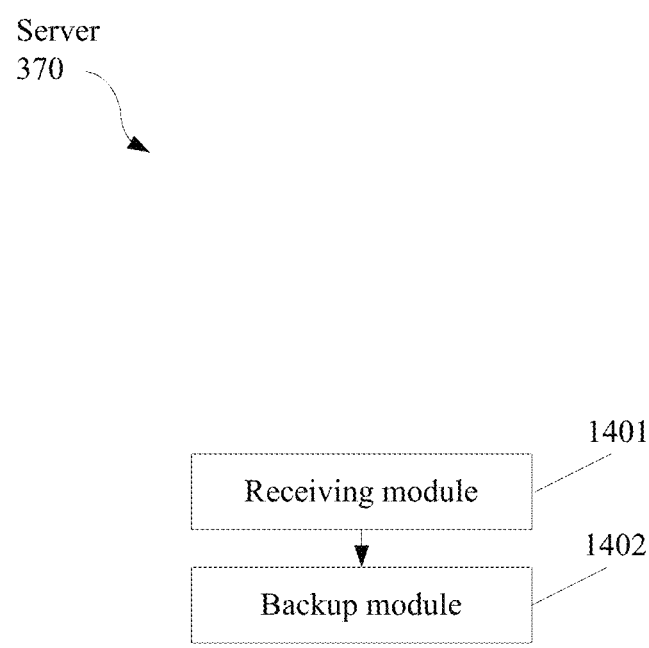
FIG. 8 is a schematic structural diagram of a server according to Embodiment 3.

As shown in FIG. 8, this embodiment provides a server, where the server includes the following modules:

a receiving module 1401, configured to receive a short message backup database file sent by a mobile terminal, where the short message backup database file is obtained by storing a local short message of the mobile terminal according to a preset format supported by the mobile terminal; and a backup module 1402, configured to correspondingly store the short message backup database file and a user account, so as to complete short message backup.

Note that the above modules and other modules described below are described as distinct entities for purposes of illustration. The operations performed by these modules can be combined or decomposed into various arrangements of one or more modules as required by different embodiments.

Figure 9:
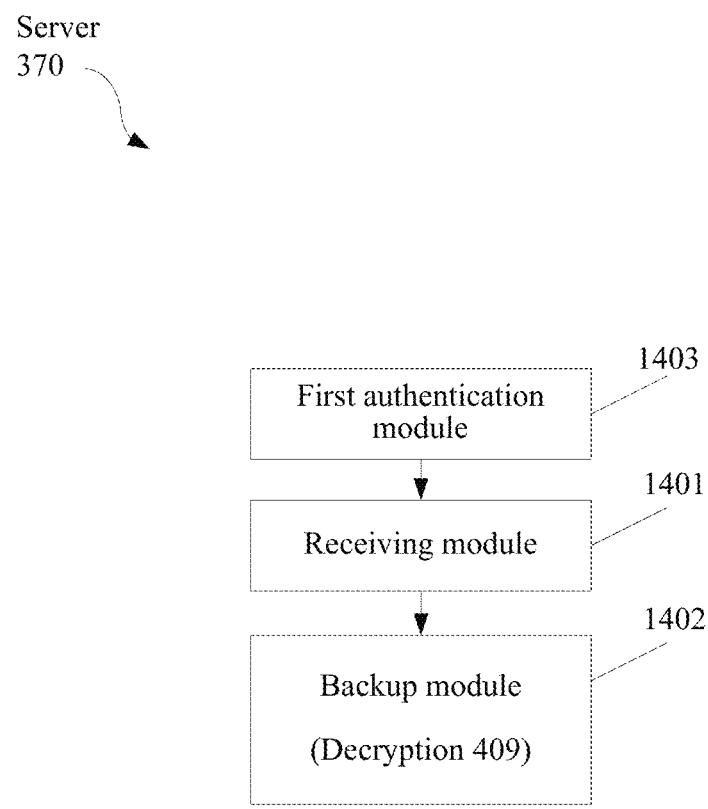
FIG. 9 is a second schematic structural diagram of a server according to Embodiment 4.

Furthermore, as shown in FIG. 9, some embodiments of a server further include:

a first authentication module 1403, configured to receive a request for authenticating the user account that is sent by the mobile terminal, and authenticate the user account; where the receiving module 1401 is specifically configured to: after the first authentication module succeeds in the authentication of the user account, receive the short message backup database file sent by the mobile terminal.

Furthermore, in some embodiments, the backup module 1402 is specifically configured to decrypt (409) an encrypted short message backup database file sent by the mobile terminal to obtain the short message backup database file, and correspondingly store the short message backup database file and the user account, so as to complete the short message backup.

Figure 10:
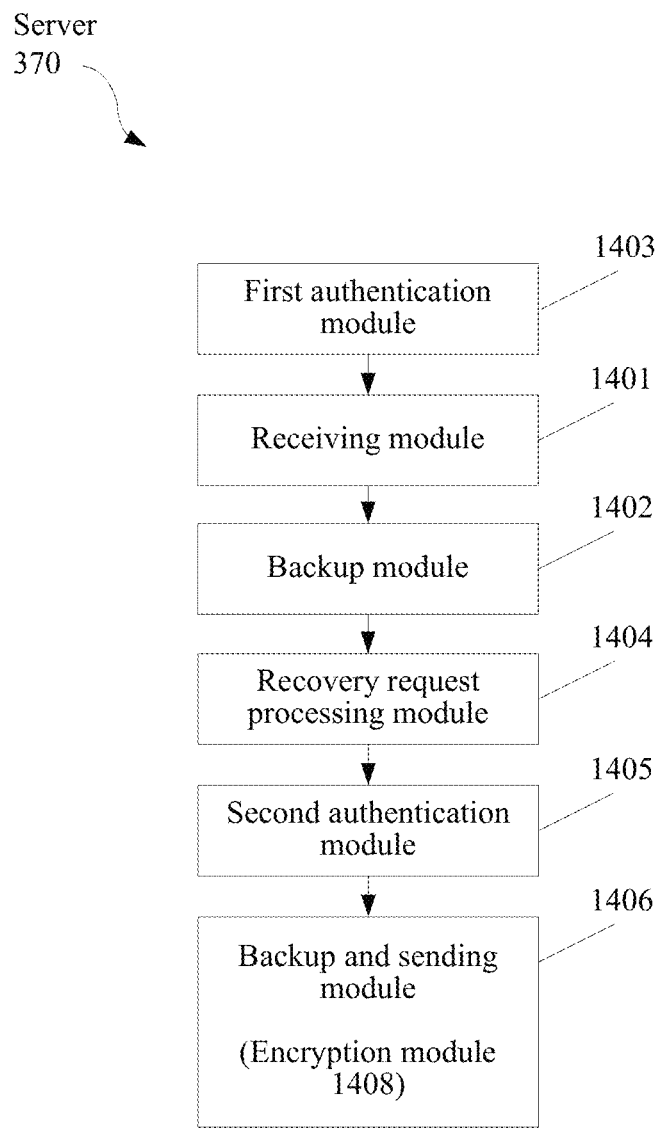
FIG. 10 is a third schematic structural diagram of a server according to Embodiment 4.

Furthermore, as shown in FIG. 10, some embodiments of the server further include:

a recovery request processing module 1404, configured to receive a request for recovering the short message that is sent by the recovery request module, where the request for recovering the short message carries information of the user account;

a second authentication module 1405, configured to authenticate the user account; and a backup and sending module 1406, configured to: after the second authentication module succeeds in the authentication of the user account, encrypt the short message backup database file, and send the encrypted short message backup database file to the mobile terminal, so that the mobile terminal performs a decryption operation on the encrypted short message backup database file to obtain the short message backup database file, and obtains content of the short message, sending time of the short message, a data amount of the short message, and a phone number of a sender of the short message or a phone number of a receiver of the short message by parsing according to the preset format, so as to complete short message recovery.

This embodiment provides a server, where the server can receive a short message backup database file obtained by storing a local short message of a mobile terminal according to a preset format supported by the mobile terminal, and perform backup, so that the reliability and compatibility of short message backup are improved, and an operation is simple.

Furthermore, the present invention further provides a short message backup system, where the system includes any one of the mobile terminals in Embodiment 3 and any one of the servers in Embodiment 4.

FIG. 11 is a block diagram of a mobile terminal 300 (e.g., a mobile phone, smart phone, tablet computer, laptop computer or a portable gaming device) that is configured to perform any of the short message backup and/or recovery methods described above with reference to FIGS. 1 to 7. The mobile terminal 300 typically includes one or more processing units (CPU's) 1102 for executing modules, programs and/or instructions stored in memory 1114 and thereby performing processing operations; one or more network or other communications interfaces 1104; memory 1114; and one or more communication buses 1112 for interconnecting these components. The communication buses 1112 may include circuitry (sometimes called a chipset) that interconnects and controls communications between system components. A mobile terminal 300 includes a user interface 1106 comprising a display device 1108 and one or more input devices or mechanisms 1110. In some embodiments, the input device/mechanism includes a keyboard; in some embodiments, the input device/mechanism includes a "soft" keyboard, which is displayed as needed on the display device 1108, enabling a user to "press keys" that appear on the display 1108. In some embodiments, the memory 1114 includes high-speed random access memory, such as DRAM, SRAM, DDR RAM or other random access solid state memory devices. In some embodiments, the memory 1114 includes non-volatile memory, such as one or more magnetic disk storage devices, optical disk storage devices, flash memory devices, or other non-volatile solid state storage devices. Optionally, the memory 1114 includes one or more storage devices remotely located from the CPU(s) 1102. Memory 1114, or alternately the non-volatile memory device(s) within memory 1114, comprises a computer readable storage medium.

Figure 11B:
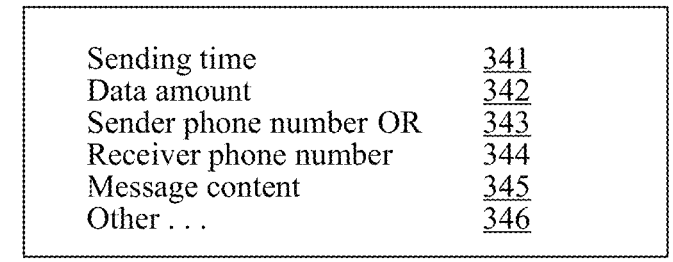
FIG. 11B is a block diagram of a data structure used for local short messages at a mobile terminal.
Figure 11C:
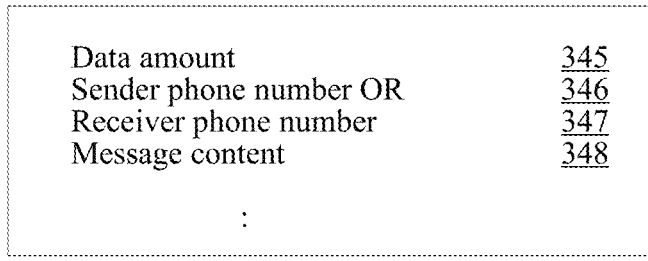
FIG. 11C is a block diagram of a data structure used for storage of short messages in a short message backup database.

In some embodiments, memory 1114, or the computer readable storage medium of memory 1114, stores the following programs, modules and data structures, or a subset thereof:

- an operating system 1120 that includes procedures for handling various basic system services and for performing hardware dependent tasks;
- a communication module 1121 that is used for connecting the mobile terminal 300 to other computers and devices via the one or more communication network interfaces 1104 (wired or wireless) and one or more communication networks, such as the Internet, other wide area networks, local area networks, metropolitan area networks, and so on;
- an obtaining module 301 as described herein;
- a storage module 302 as described herein;
- a sending module 303 as described herein;
- an authentication request module 304 as described herein;
- a recovery request module 305 as described herein;
- a receiving module 306 as described herein;
- a recovery module 307 as described herein;
- an encryption module 308 as described herein;
- a decryption module 309 as described herein;
- a messaging module 310 (or other client application) that enables a user to send, receive, review and manage, which is the mo as described herein;
- a web browser 311 (or other client application) that enables a user to communicate over a network (such as the Internet) with remote computers or devices;
- data associated with one or more local mailboxes 316, which include, in some embodiments, an inbox 317, an outbox 320 a draft mailbox 323 and one or more user-defined mailboxes 326. Each mailbox includes an identifier (e.g., identifiers 318, 321, 324 and 327 associated with the inbox, outbox, draft mailbox and user-defined mailbox) and associated short messages 319. FIG. 11B illustrates a format of the local short messages 319. In some embodiments, each short message as stored in a mailbox includes one or more of: sending time 341 of a message 319, data amount (size) of the message, the senders phone number 343 OR the receiver's phone number 344 associated with the message 319, message content 345 and other fields 346.
- a definition of a preset message backup format 320, which is employed by the mobile terminal 300 to reformat the short messages 319 prior to storing them in the short message backup database 330. As described herein, the preset message backup format 320 is selected so as to be compatible with requirements of the server 370 to which the local short messages are backed-up as described herein.
- data associated with the short message backup database 330, which includes messages and related information saved for one or more of the local mailboxes 316. In some embodiments, each of the local mailboxes 316 that is backed up and saved in the short message backup database 330 (e.g., Mailbox 1 332-1 and Mailbox 2 332-2) includes backup short messages 333. As noted above, each of the backup short messages are formatted according to the preset message format 320. FIG. 11C illustrates a format of the backup short messages 333. In some embodiments, each short message 333 as stored in a mailbox 332 includes one or more of: data amount (size) of the message 345, the sender's phone number 346 OR the receiver's phone number 347 associated with the message 333, and message content 348.

FIG. 12 is a block diagram of a server 370 that is configured to perform any of the short message backup and/or recovery methods described above with reference to FIGS. 1 to 4 and 8-10. The mobile terminal 300 typically includes one or more processing units (CPU's) 1202 for executing modules, programs and/or instructions stored in memory 1214 and thereby performing processing operations; one or more network or other communications interfaces 1204; memory 1214; and one or more communication buses 1212 for interconnecting these components. The communication buses 1212 may include circuitry (sometimes called a chipset) that interconnects and controls communications between system components. In some embodiments, the memory 1214 includes high-speed random access memory, such as DRAM, SRAM, DDR RAM or other random access solid state memory devices. In some embodiments, the memory 1214 includes non-volatile memory, such as one or more magnetic disk storage devices, optical disk storage devices, flash memory devices, or other non-volatile solid state storage devices. Optionally, the memory 1214 includes one or more storage devices remotely located from the CPU(s) 1102. Memory 1214, or alternately the non-volatile memory device(s) within memory 1214, comprises a computer readable storage medium.

In some embodiments, memory 1214, or the computer readable storage medium of memory 1214, stores the following programs, modules and data structures, or a subset thereof:

- an operating system 1220 that includes procedures for handling various basic system services and for performing hardware dependent tasks;

a communication module 1221 that is used for connecting the mobile terminal 300 to other computers and devices via the one or more communication network interfaces 1204 (wired or wireless) and one or more communication networks, such as the Internet, other wide area networks, local area networks, metropolitan area networks, and so on;

a first authentication module 1403 as described herein;

a receiving module 1401 as described herein;

a backup module 1402 as described herein;

a recovery quest processing module 1404 as described herein;

a second authentication module 1405 as described herein;

a backup and sending module 1406 as described herein;

an encryption module 1408 as described herein, which is complementary in operation to the decryption module 309 provided by the mobile terminal 300;

a decryption module 1409 as described herein, which is complementary in operation to the encryption module 308 provided by the mobile terminal 300;

a definition of a preset message backup format 320, which is employed by the mobile terminal 300 to reformat the short messages 319 prior to storing them in the short message backup database 330.

data associated with the backed-up message database 330, which includes messages and related information for one or more of the local mailboxes 316 that were saved in the short message backup database 330 and transmitted by a mobile terminal 300 to the server 370 as part of a backup operation. In some embodiments, each of the local mailboxes 316 that is backed up and saved in the backed-up message database 330 (e.g., Mailbox 1 332-1 and Mailbox 2 332-2) includes backup short messages 333. As noted above, each of the backup short messages are formatted according to the preset message format 320. FIG. 11C illustrates a format of the backup short messages 333. In some embodiments, each short message 333 as stored in a mailbox 332 includes one or more of at least: data amount (size) of the message 345, the sender's phone number 346 OR the receiver's phone number 347 associated with the message 333, and message content 348. Note that the backup server 370 is configured to backup mailboxes 332 from a plurality of different users (e.g., User Account 1 1230-1 and User Account 2 1230-2). Consequently, the server maintains user ID and password information 1231 and 1232 for the plurality of users for which it maintains short message backups.

Figure 13:
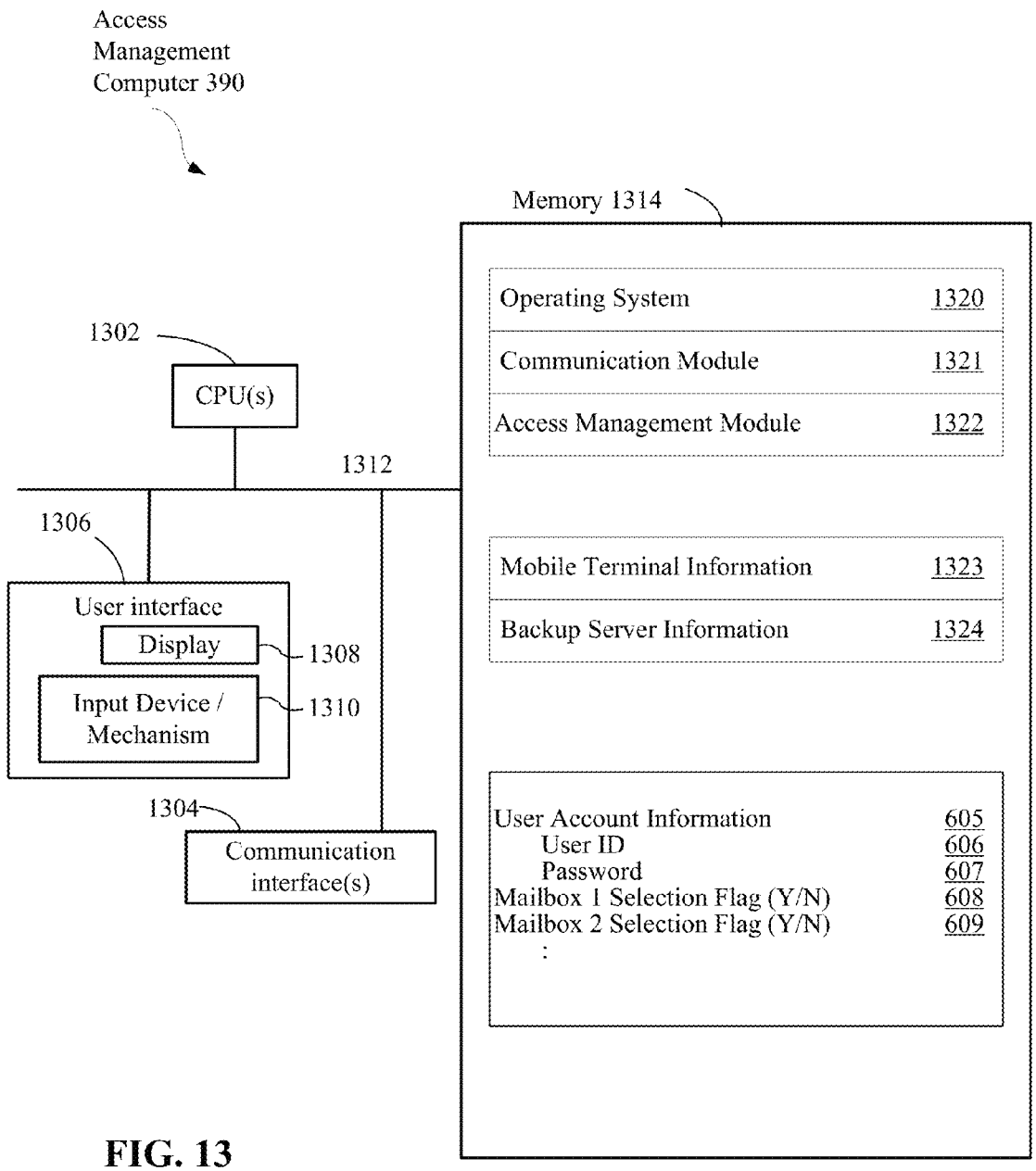
FIG. 13 is a block diagram of an access management computer according to some embodiments.

FIG. 13 is a block diagram of an access management computer 390 (e.g., a personal computer, or PC) that is configured to allow a user to manage and control small message backup and recovery operations associated with their local short messages and mobile terminals 300. In some embodiments, the access management computer 390 enables a user to perform various operations related to the small message backup and recovery operations by logging into the server 370 from the PC 390 using account information, and performing operations such as editing, deletion, and copying of one or more backed-up short messages or entire short message mailboxes, for the user's small message account corresponding to the provided account information.

The access management computer 390 typically includes one or more processing units (CPU's) 1302 for executing modules, programs and/or instructions stored in memory 1214 and thereby performing processing operations; one or more network or other communications interfaces 1304; memory 1314; and one or more communication buses 1312 for interconnecting these components. The communication buses 1312 may include circuitry (sometimes called a chipset) that interconnects and controls communications between system components. In some embodiments, the memory 1314 includes high-speed random access memory, such as DRAM, SRAM, DDR RAM or other random access solid state memory devices. In some embodiments, the memory 1314 includes non-volatile memory, such as one or more magnetic disk storage devices, optical disk storage devices, flash memory devices, or other non-volatile solid state storage devices. Optionally, the memory 1314 includes one or more storage devices remotely located from the CPU(s) 1302. Memory 1314, or alternately the non-volatile memory device(s) within memory 1314, comprises a computer readable storage medium.

In some embodiments, memory 1314, or the computer readable storage medium of memory 1214, stores the following programs, modules and data structures, or a subset thereof:

an operating system 1320 that includes procedures for handling various basic system services and for performing hardware dependent tasks;

a communication module 1321 that is used for connecting the mobile terminal 300 to other computers and devices via the one or more communication network interfaces 1204 (wired or wireless) and one or more communication networks, such as the Internet, other wide area networks, local area networks, metropolitan area networks, and so on;

mobile terminal information that enables a user of the access management computer 390 to access and manage short message facilities of their mobile terminals 300;

user account information 605 for the user, which includes a user ID 606 and password 607 that enables a user of the access management computer 390 to access and manage short message backup and recovery facilities of their backed-up short message accounts on the backup server 370;

selection flags for the user's mailboxes 608, 609 that respectively indicate whether particular mailboxes are to be backed up (Y or N).

Persons of ordinary skill in the art may understand that, all or a part of the steps of the foregoing embodiments may be implemented through hardware, or may be implemented by a program instructing relevant hardware. The program may be stored in a computer readable storage medium. The storage medium may be a read-only memory, a magnetic disk, an optical disk, or the like.

The foregoing descriptions are merely exemplary embodiments of the present invention, but are not intended to limit the present invention. Any modification, equivalent replacement, or improvement made within the spirit and principle of the present invention shall fall within the protection scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain principles of the invention and its practical applications, to thereby enable others skilled in the art to best utilize the invention and various embodiments with various modifications as are suited to the particular use contemplated. Embodiments include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A short message backup method, comprising:
obtaining a local short message of a first mobile terminal in a first short message format supported by the first mobile terminal, wherein the short message at least comprises content of the short message, sending time of the short message, a data amount of the short message, and a phone number of a sender of the short message or a phone number of a receiver of the short message, converting the local short message from the first short message format to a preset format supported by a remote server and storing the local short message of the first mobile terminal in a local short message backup database file according to the preset format supported by the remote server, wherein the preset format supported by the remote server is preselected by the first mobile terminal among a plurality of formats that are known to be supported by the remote server and the first mobile terminal, the storing further comprising storing the content of the short message, the sending time of the short message, the data amount of the short message, and the phone number of the sender of the short message or the phone number of the receiver of the short message in the local short message backup database file according to the preset format and based on a field; and sending the short message backup database file from the first mobile terminal to the remote server, wherein the remote server stores the short message backup database file in association with a user account, so as to complete short message backup, the sending further comprising encrypting the short message backup database file to obtain the encrypted short message backup database file, and sending the encrypted short message backup database file to the remote server, so that the remote server stores the short message backup database file and the user account after performing decryption, so as to complete the short message backup, wherein:

after the short message backup is completed, the remote server receives a request for recovering the short message from a second mobile terminal, the request for recovering the short message carrying information of the user account and a second short message format supported by the second mobile terminal, and the second short message format is different from the first short message format, after receiving the request for recovering the short message, the remote server converts the short message backup database file from the preset format to the second short message format and encrypts the converted short message backup database file and sends the encrypted short message backup database file to the second mobile terminal, and after receiving the short message backup database file encrypted and sent by the remote server, the second mobile terminal performs a decryption operation on the short message backup database file encrypted and sent by the remote server and obtains the content of the short message, the sending time of the short message, the data amount of the short message, and the phone number of the sender of the short message or the phone number of the receiver of the short message by parsing according to the preset format.

2. The method according to claim 1, wherein the obtaining the local short message comprises:
obtaining an identifier of a local mailbox in the mobile terminal that is specified by a user, and performing traversal in the mailbox according to the identifier of the mailbox, so as to obtain a short message in the mailbox.

3. The method according to claim 1, further comprising:
before the sending the short message backup database file to the remote server, sending a request for authenticating the user account to the remote server, so that the remote server stores the short message backup database file and the user account after the request for authentication succeeds, so as to complete the short message backup.

4. A mobile terminal, comprising:
one or more processors;
memory; and
one or more program modules stored in the memory and to be executed by the one or more processors, the program modules further including:
  an obtaining module, configured to obtain a local short message of the mobile terminal in a first short message format supported by the mobile terminal, wherein the short message at least comprises content of the short message, sending time of the short message, a data amount of the short message, and a phone number of a sender of the short message or a phone number of a receiver of the short message;
  a storage module, configured to convert the local short message from the first short message format to a preset format supported by a remote server and store the local short message of the mobile terminal in a local short message backup database file according to the preset format supported by the remote server, wherein the preset format supported by the remote server is preselected by the mobile terminal among a plurality of formats that are known to be supported by the remote server and the mobile terminal, the storing further comprising storing the content of the short message, the sending time of the short message, the data amount of the short message, and the phone number of the sender of the short message or the phone number of the receiver of the short message in the local short message backup database file according to the preset format and based on a field; and
  a sending module, configured to send the short message backup database file to the remote server, wherein the remote server stores the short message backup database file and a user account, so as to complete short message backup, the sending further comprising encrypting the short message backup database file to obtain the encrypted short message backup database file, and sending the encrypted short message backup database file to the remote server, so that the remote server stores the short message backup database file and the user account after performing decryption, so as to complete the short message backup, wherein:
  after the short message backup is completed, the remote server receives a request for recovering the short message from a second mobile terminal, the request for recovering the short message carrying information of the user account and a second short message format supported by the second mobile terminal, and the second short message format is different from the first short message format,
  after receiving the request for recovering the short message, the remote server converts the short message backup database file from the preset format to the second short message format and encrypts the converted short message backup database file and sends the encrypted short message backup database file to the second mobile terminal, and after receiving the short message backup database file encrypted and sent by the remote server, the second mobile terminal performs a decryption operation on the short message backup database file encrypted and sent by the remote server and obtains the content of the short message, the sending time of the short message, the data amount of the short message, and the phone number of the sender of the short message or the phone number of the receiver of the short message by parsing according to the preset format.

5. The mobile terminal according to claim 4, wherein the obtaining module is configured to obtain an identifier of a local mailbox in the mobile terminal that is specified by a user, and perform traversal in the mailbox according to the identifier of the mailbox, so as to obtain a short message in the mailbox.

6. The mobile terminal according to claim 4, wherein the one or more program modules further comprise:
  an authentication request module, configured to: before the sending module sends the short message backup database file to the remote server, send a request for authenticating the user account to the remote server, so that the remote server stores the short message backup database file and the user account after the request for authentication succeeds, so as to complete the short message backup.

7. The mobile terminal according to claim 4, wherein the one or more program modules further comprise:
  a recovery request module, configured to send a request for recovering the short message to the remote server, wherein the request for recovering the short message carries information of the user account;
  a receiving module, configured to: after the remote server succeeds in the authentication of the user account, receive the short message backup database file encrypted and sent by the remote server; and
  a recovery module, configured to perform a decryption operation on the short message backup database file encrypted and sent by the remote server, so as to obtain the short message backup database file, and obtain the content of the short message, the sending time of the short message, the data amount of the short message, and the phone number of the sender of the short message or the phone number of the receiver of the short message by parsing according to the preset format, so as to complete short message recovery.

8. A server, comprising:
one or more processors;
memory; and
one or more program modules stored in the memory and to be executed by the one or more processors, the program modules further including:
  a receiving module, configured to receive a short message backup database file sent by a mobile terminal, wherein the short message backup database file is generated by the mobile terminal, after obtaining a local short message in a first short message format supported by the mobile terminal, wherein the short message at least comprises content of the short message, sending time of the short message, a data amount of the short message, and a phone number of a sender of the short message or a phone number of a receiver of the short message, by converting the local short message from the first short message format to a preset format supported by the server and storing the local short message of the mobile terminal according to the preset format supported by the mobile terminal, the storing further comprising storing the content of the short message, the sending time of the short message, the data amount of the short message, and the phone number of the sender of the short message or the phone number of the receiver of the short message in the local short message backup database file according to the preset format and based on a field, and encrypting the short message backup database file to obtain the encrypted short message backup database file, and sending the encrypted short message backup database file to the server, so that the server stores the short message backup database file and the user account after performing decryption, so as to complete the short message backup, wherein the preset format supported by the remote server is preselected by the mobile terminal among a plurality of formats that are known to be supported by the remote server and the mobile terminal; and a backup module, configured to store the short message backup database file and a user account, so as to complete short message backup, wherein:

after the short message backup is completed, the server is configured to receive a request for recovering the short message from a second mobile terminal, the request for recovering the short message carrying information of the user account and a second short message format supported by the second mobile terminal, and the second short message format is different from the first short message format, after receiving the request for recovering the short message, the remote server is configured to convert the short message backup database file from the preset format to the second short message format and encrypt the converted short message backup database file and send the encrypted short message backup database file to the second mobile terminal, and after receiving the short message backup database file encrypted and sent by the remote server, the second mobile terminal is configured to perform a decryption operation on the short message backup database file encrypted and sent by the remote server and obtains the content of the short message, the sending time of the short message, the data amount of the short message, and the phone number of the sender of the short message or the phone number of the receiver of the short message by parsing according to the preset format.

9. The server according to claim 8, wherein the one or more program modules further comprise:

a first authentication module, configured to receive a request for authenticating the user account that is sent by the mobile terminal, and authenticate the user account; wherein the receiving module is configured to: after the first authentication module succeeds in the authentication of the user account, receive the short message backup database file sent by the mobile terminal.

10. The server according to claim 9, wherein the receiving module is configured to: after the authentication of the user account succeeds, receive an encrypted short message backup database file sent by the mobile terminal; and the backup module is configured to decrypt the encrypted short message backup database file sent by the mobile terminal to obtain the short message backup database file, and store the short message backup database file and the user account, so as to complete the short message backup.

11. The server according to claim 10, wherein the one or more program modules further comprise:

a recovery request processing module, configured to receive a request for recovering the short message that is sent by the recovery request module, wherein the request for recovering the short message carries information of the user account;

a second authentication module, configured to authenticate the user account; and a backup and sending module, configured to: after the second authentication module succeeds in the authentication of the user account, encrypt the short message backup database file, and send the encrypted short message backup database file to the mobile terminal, so that the mobile terminal performs a decryption operation on the encrypted short message backup database file to obtain the short message backup database file, and obtains content of the short message, sending time of the short message, a data amount of the short message, and a phone number of a sender of the short message or a phone number of a receiver of the short message by parsing according to the preset format, so as to complete short message recovery.

\* \* \* \* \*